(12) United States Patent
Lenhardt

(10) Patent No.: US 6,234,355 B1
(45) Date of Patent: May 22, 2001

(54) MACHINE FOR FILLING THE EDGE JOINTS OF INSULATING GLASS PANES WITH A SEALING COMPOUND CONSISTING OF TWO CONSTITUENTS

(75) Inventor: Karl Lenhardt, Neuhausen-Hamberg (DE)

(73) Assignee: Lenhardt Maschinenbau GmbH, Neuhausen-Hamberg (DE)

( * ) Notice: Subject to any disclaimer, the term of this patent is extended or adjusted under 35 U.S.C. 154(b) by 0 days.

(21) Appl. No.: 09/485,179

(22) PCT Filed: Jul. 30, 1998

(86) PCT No.: PCT/EP98/04760

§ 371 Date: Feb. 3, 2000

§ 102(e) Date: Feb. 3, 2000

(87) PCT Pub. No.: WO99/07462

PCT Pub. Date: Feb. 18, 1999

(30) Foreign Application Priority Data

| Aug. 7, 1997 | (DE) | 197 34 284 |
| Aug. 18, 1997 | (DE) | 197 35 622 |
| Dec. 18, 1997 | (DE) | 197 56 414 |

(51) Int. Cl.⁷ .................................................. B01F 15/02
(52) U.S. Cl. ........................................ 222/135; 222/145.5
(58) Field of Search ............................ 222/135, 145.1, 222/145.5, 145.6

(56) References Cited

U.S. PATENT DOCUMENTS

| 3,876,114 | * | 4/1975 | Hicks et al. | 222/145.5 |
| 4,634,024 | * | 1/1987 | Vollenweider | 222/135 |
| 4,714,425 | * | 12/1987 | Lenhardt | 425/461 |
| 5,004,159 | * | 4/1991 | Kistner | 239/337 |
| 5,005,765 | * | 4/1991 | Kistner | 239/135 |
| 5,382,397 | * | 1/1995 | Turner, Jr. | 264/46.5 |
| 5,462,199 | * | 10/1995 | Lenhardt | 222/54 |

FOREIGN PATENT DOCUMENTS

| 3703929 | 8/1988 | (DE) . |
| 3913000 | 12/1989 | (DE) . |
| 3937900 | 1/1991 | (DE) . |
| 19735622 | 8/1996 | (DE) . |
| 0326510 | 1/1989 | (EP) . |
| 0336138 | 11/1989 | (EP) . |
| 0709144 | 5/1996 | (EP) . |
| 2597025 | 4/1986 | (FR) . |

* cited by examiner

Primary Examiner—J. Casimer Jacyna
(74) Attorney, Agent, or Firm—Horst M. Kasper

(57) ABSTRACT

The invention describes a machine for filling the edge joint of insulating glass panes with a semi-liquid to paste-like sealing compound, consisting of a main constituent and a secondary constituent, which are different in chemical terms and in terms of their viscosity, having two pumps (3, 6) which convey the two constituents from two reservoirs (1, 2) into separate intermediate storage chambers (5, 8), and having separate, synchronously driven volumetric feed metering pumps (14, 19) for conveying the constituents in a predetermined composition to a mixer (16) and then on to a nozzle (17), the nozzle and the mixer belonging to one sub-assembly which is movably mounted as a whole on a frame of the machine. According to the invention, there is provided a gear pump (14), driven by a servomotor, as metering pump for the main constituent in combination with a piston pump (19), which serves as a metering pump for the secondary constituent and whose piston (10) is driven by a second servomotor (23), both of which preferably are part of the movable sub-assembly.

15 Claims, 2 Drawing Sheets

MACHINE FOR FILLING THE EDGE JOINTS OF INSULATING GLASS PANES WITH A SEALING COMPOUND CONSISTING OF TWO CONSTITUENTS

BACKGROUND OF THE INVENTION

The present invention proceeds from a machine having the features defined in the preamble of claim 1. A machine of this kind has been known from DE-A-39 37 900. The known machines serve for sealing an insulating glass pane with an adhesive and sealing compound consisting of two constituents (main constituent and secondary constituent). Each of the two constituents is conveyed by a separate pump from a barrel into an intermediate storage chamber. The intermediate storage chambers are designed as piston pumps and supply gear pumps that convey the constituents to a static mixer with a nozzle provided on its end. An arrangement comprising even two successive gear pumps is provided for the main constituent. The arrangements, consisting of piston pumps and gear pumps, are stationary and connected via heated pressure hoses and heated articulated pipes with the mixer and nozzle arrangement, which latter travels along the edge of an insulating glass pane for sealing the latter. The lines cause a considerable pressure loss to occur and require extreme pressures of up to 400 bar at the pump outlets, due to the high viscosity (250–400 Pa). This entails further disadvantages: Extension of the lines and the compressibility of the compounds to be conveyed lead to metering inaccuracies; structural parts that are exposed to the compound flow are subject to increased wear; the same is true for the gear pumps and even can be drastically aggravated in the case of two-component adhesives with abrasive fillers, as normally used for sealing insulating glass panes, which may result in insufficient service life.

In order to circumvent the described wear on gear pumps, it has been known to use piston pumps for metering two-component adhesive and sealing compounds for sealing insulating glass panes (DE-A-37 03 929), in which case the pumps are supplied from an intermediate storage chamber, being in its turn supplied by a barrel pump from the respective reservoir (barrel) of the respective constituent. Here again, the hydraulically driven piston pumps are stationary and supply the mixer and nozzle arrangement via heated pressure hoses and heated articulated pipes, with the disadvantages for the metering accuracy described before. The arrangement comprising the piston pumps, intermediate storage chambers and the hydraulic drives weighs approximately 600 Kg. and cannot possibly be moved together with the nozzle.

From DE-A-39 13 000 it has been known to arrange a buffer vessel for a high-viscosity, paste-like, compressible substance near a nozzle which is supplied with that substance from the buffer vessel. However, metering of the substance is pressure-controlled, not volumetric, by subjecting the substance—which is conveyed to the nozzle through the buffer vessel by means of a stationary piston pump, for example—to a constant controlled pressure in the buffer vessel, for which purpose a pressure sensor, being part of a pressure control loop, is required in the area between the buffer vessel and the nozzle. It is a disadvantage of this system that any variation in the composition of the substance, the temperature or the viscosity, the degree of cross-linking of two constituent mixtures, etc., lead to metering inaccuracies immanent to any pressure-controlled metering system.

EP-0 709 144 A1 discloses a device having the features of the preamble of claim 1 where the intermediate storage chamber for the respective constituent is formed by a vessel, which is divided by a membrane into two chambers one of which serves to accommodate the respective constituent while the other can be supplied with a hydraulic fluid via a hydraulic pump, acting as volumetric metering pump, so that the hydraulic fluid in the vessel displaces a corresponding quantity of the respective constituent of the sealing compound. The two separate intermediate storage chambers, intended for the two constituents of the sealing compound, are supplied with the hydraulic liquid by one and the same hydraulic pump, via separately driven proportional valves. It is a disadvantage of this known device that the control valves are not capable of effecting the rapid changes in the delivery rate of the sealing compound with the necessary accuracy and the required speed. Another problem lies in the fact that the required high extrusion pressure is difficult to maintain at low delivery rates (EP 0 445 101 B1).

FR-2.597.025 A describes a device for applying a strand of a single-component adhesive on a workpiece having a piston pump which is driven by a motor via a spindle drive. A pressure sensor is provided on the cylinder of the piston pump in the area before its chamber. In order to control the quantity of adhesive exiting the nozzle, the motor speed is adjusted to the desired value via suitable control means in the case of FR-2.597.025 A.

Further disadvantages of the devices known from EP 0 709 144 and DE-37 03 929 A1 are seen in the fact that the hydraulic unit driving the metering pumps must be permanently active during operation of the devices so that energy is consumed, heat is generated and noise is developed even during times where no insulating glass panes are sealed. In addition, the quantity of the constituents present before the respective feeding member of the metering pumps (the piston in the case of a piston pump or the membrane in the reservoir according to EP 0 709 144 A1) is variable so that the marginal conditions for the metering process and the metering accuracy depend on the momentary quantity of the constituents present between the nozzle and the feeding member, which is a disadvantage especially in connection with the higher-viscosity main constituent as the latter typically accounts for approximately 90% of the sealing compound and, on top of everything, is thixotropic when a thiokol is used as sealing compound, as is usually the case.

SUMMARY OF THE INVENTION

Now, it is the object of the present invention to provide a machine of the before-mentioned kind which permits the quantity of sealing compound exiting the nozzle in a time unit during filling of the edge joint of insulating glass panes to be controlled with greater accuracy and more rapidly.

This object is achieved by a machine having the features defined in claim 1. Advantageous further developments of the invention are the subject of the sub-claims.

According to the invention, a gear pump, driven by a servomotor, is used as metering pump for the higher-viscosity main constituent of the sealing compound, whereas a piston pump, whose piston is driven by a second servomotor, is used as metering pump for the lower-viscosity secondary constituent of the sealing compound. The two metering pumps operate in synchronism and are combined, together with their drives and the nozzle and the mixer, to one sub-assembly movably mounted, as a single unit, on the machine frame. For reasons of metering accuracy a plunger pump is preferred as piston pump.

The combination of features according to the invention presents the following significant advantages:

Combining the nozzle, mixer and metering pumps to a single assembly, which is movably mounted on the machine as a single unit, allows the shortest possible lines and minimum material volumes to be present on the way from the metering pumps to the nozzle, which is moved along the edge joint of the insulating glass panes during sealing of the latter.

The short lines and the small material quantities contained in them have the result that in spite of the high viscosity of the constituents to be conveyed the delivery pressures can be kept low enough to eliminate the need for a hydraulic unit for the metering process. This creates the necessary preconditions to permit the metering pumps and the associated intermediate storage chambers to be combined with the mixer and the nozzle to a single assembly that can be moved in its entirety, which is a particularly preferred and advantageous further development of the invention. The intermediate storage chambers as such do not oppose this solution as they never have to contain more material than is needed for sealing one insulating glass pane. Instead, the storage quantity even may be smaller if the possibility is provided to refill the respective intermediate storage chamber during sealing of one insulating glass pane. For this purpose, the intermediate storage chamber for the more viscous main constituent is preferably designed as a piston-cylinder unit with a relatively low pressure of maximally 20 to 30 bar acting on the piston, which pressure need not be applied hydraulically, but can be produced pneumatically. The more viscous main constituent can be currently refilled into the cylinder of the piston-cylinder unit from its reservoir, against that initial pressure. To this end, the pump performing the refilling process can be controlled by two positional sensors (positional switches), one of them responding to the forward position of the piston and the other one responding to the rear position of the piston. The forward positional switch is arranged in such a way that it will respond when the cylinder is almost empty, whereas the rear positional sensor is arranged so that it will respond when the cylinder is almost full. When the forward positional switch responds to the piston, the pump that functions to refill the more viscous main constituent from the reservoir is switched on, whereas it is switched off again when the rear positional sensor responds.

In this way, the gear pump can perform its metering action without interruption, and is in addition provided, by the piston-cylinder unit acting as intermediate storage chamber for the main constituent, with an initial pressure that helps maintain a high metering accuracy.

Given the fact that the quantity of the secondary constituent is in the order of only $\frac{1}{10}$ of the quantity of the sealing compound, it is sufficient to use the cylinder of the piston pump, being preferably a plunger pump, directly as intermediate storage chamber for the secondary constituent so that no separate intermediate storage chamber for the secondary constituent is needed. This makes the metering system for the secondary constituent especially light in weight and compact.

The quantity of sealing compound moved by the metering pumps is relatively small. This allows rapid changes to the delivery rate, which in turn permits the quality of the seal of insulating glass panes to be improved and the sealing speed to be increased. The invention makes it possible to react more quickly to dimensional changes of the edge joint to be filled than the systems of the prior art. Another advantage of the small quantity of sealing compound present between the metering units and the nozzle lies in the fact that only relatively small pressures are now required for extruding the components. Normally, pressures of 150 to 200 bar will be sufficient, whereas pressures of up to 400 bar were encountered in the prior art. This not only allows the design to be made lighter in weight and the use of less powerful drives, that can react more quickly, but also reduces the detrimental influence which compressibility and thixotropy have on the metering accuracy.

Irrespective of the filling rate of the intermediate storage chamber the quantity of sealing compound present between the metering units and the nozzle is practically constant so that the metering accuracy is practically independent of the filling rate of the intermediate storage chamber.

Quicker reaction times have the result that a stationary delivery rate is reached earlier at the beginning of the sealing process. An initial pressure building-up phase, as required with hydraulic metering pumps, is not necessary according to the invention.

The especially precise and quickly responding operation of the invention makes it possible to meter out the sealing compound according to a previously calculated demand, that may change over time, or according to a demand determined by a detector sampling the edge joint of the insulating glass pane, whereas the prior art had to work largely with experience values since the metering process was subject to incalculable influences.

As the metering process is of a purely volumetric nature, any temperature variation will not, as in the case of the prior art, influence the metering process. A temperature-controlled booth of the kind normally used in prior art for ruling out the influence of the temperature on the metering accuracy is not needed according to the invention.

The higher reaction speed of the metering units permits in addition the metering process to be terminated more rapidly.

The transition phases between the stationary metering process and its start and stop (known as ramps) being shorter, it is easier to keep the proportion between main and secondary constituents constant during these phases.

No particular demands must be placed on the pumps and the delivery lines that lead from the reservoirs to the intermediate storage chambers, except that the pressure must be sufficient to convey the constituents into the intermediate storage chambers.

The electric servomotors permit not only the delivery rate, but also the proportion of the constituents to be changed easily and in a reproducible way. In the case of hydraulic piston pumps, any change of the proportion of the constituents requires mechanical changes to links. In the case of gear pumps, which had to work with a high delivery pressure in prior art, defined changes to the mixture ratios were more difficult because the delivery rate was dependent on the delivery pressure, the viscosity and the initial pressure of the pump.

Due to the lower delivery pressure, the gear pump is subject to lesser pressure than was the case in the prior art. Abrasive substances, that may be contained in the secondary constituent, do not entail any wear problems because the plunger pump used to meter out that constituent is insensitive to wear.

Further advantages and features of the invention will become apparent from the following description of one embodiment of the invention.

DETAILED DESCRIPTION OF THE INVENTION

Figure 1:
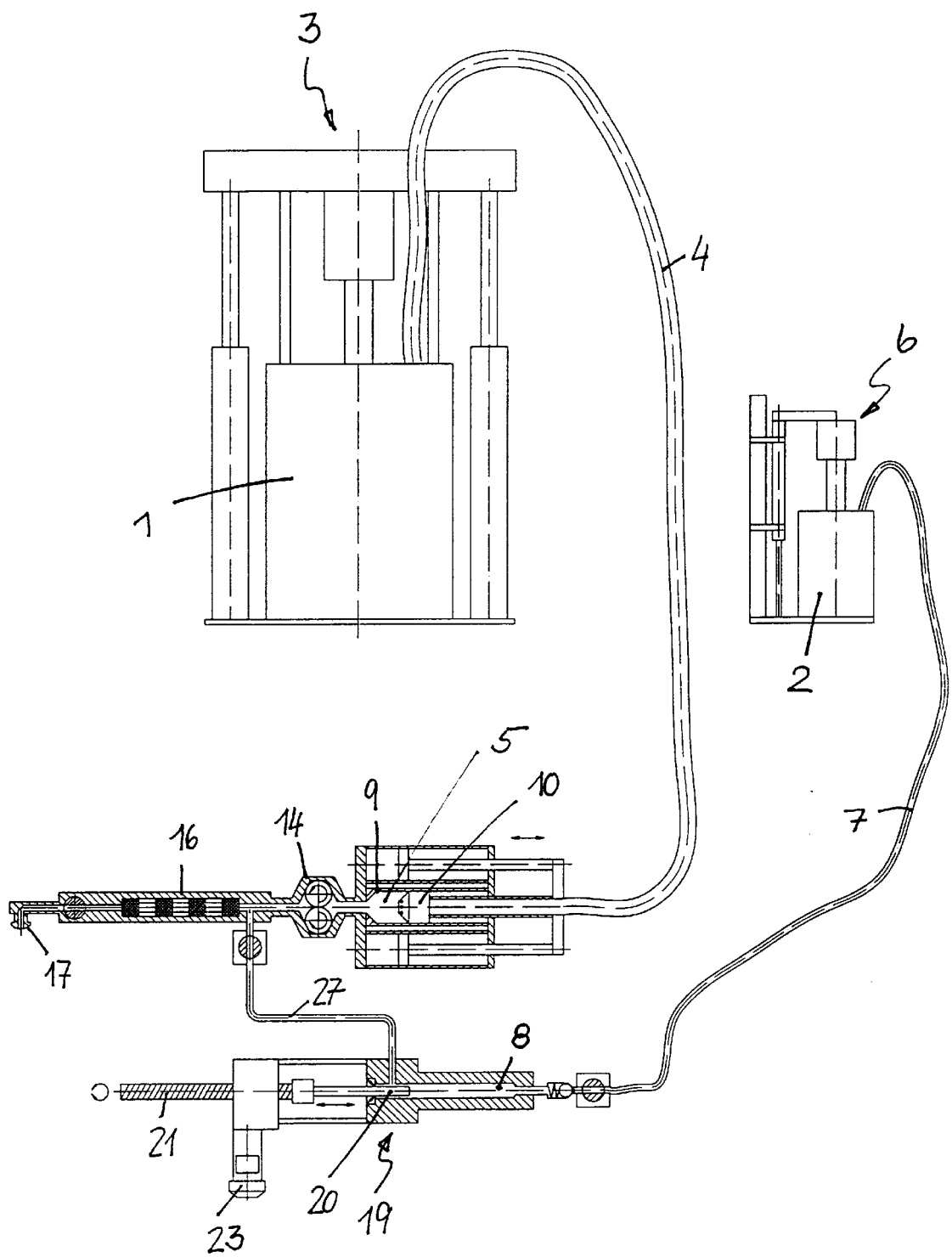
FIG. 1 shows a, partly sectional, view of a metering device according to the invention.
Figure 2:
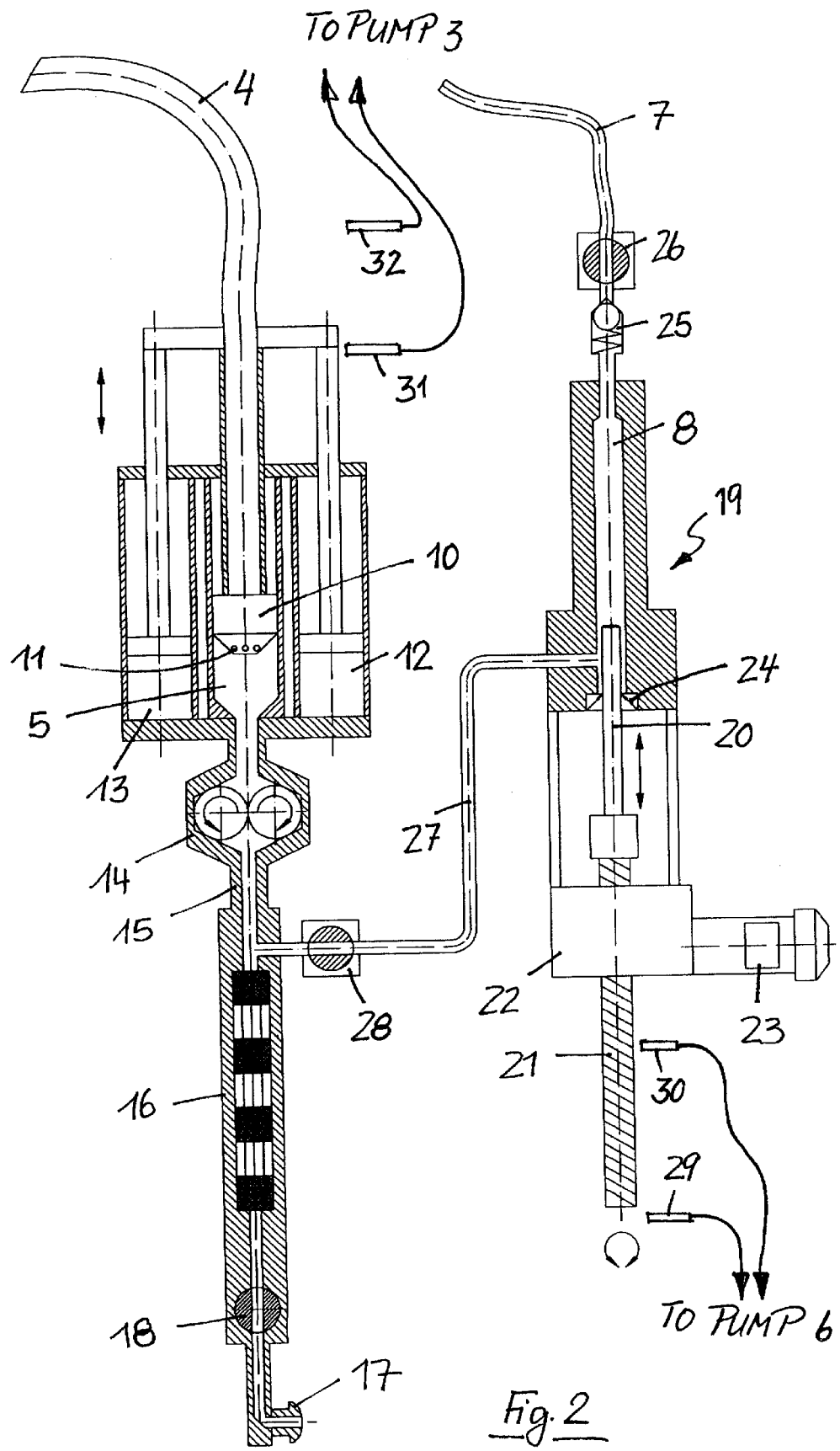
FIG. 2 shows an enlarged sectional view of a detail of FIG. 1 consisting of the arrangement comprising the metering pumps, intermediate storage chambers, the mixer and the nozzle.

The device comprises a first barrel 1 for the main constituent and a second barrel 2 for the secondary constituent of a sealing compound for insulating glass panes, preferably on the basis of thiokol (a polysulfide). The main constituent is fed from the barrel 1 through a pressure hose 4 to an intermediate storage chamber 5 by means of a barrel pump 3, the structure of which is known in the art. The secondary constituent is pumped from the barrel 2 through a pressure hose 7 into a second intermediate storage chamber 8 by a barrel pump 6, the structure of which is also known in the art.

The intermediate storage chamber 5 for the main constituent consists of the cylinder of a piston-cylinder unit 9 into which the main constituent is pumped by the piston 10, which latter is provided with one or more passages 11 for this purpose. In the intermediate storage chamber 5, the main constituent is subject to an initial pressure produced by two pneumatic piston-cylinder units 12 and 13 that act on the piston 10. Immediately before the outlet of the intermediate storage chamber 5, there is provided a gear pump 14 which is driven by a variable servomotor. The outlet of the gear pump 14 is connected, either directly or via a very short piece of line 15, with a static mixer 16 that opens into a nozzle 17, there being further provided, between the static mixer 16 and the nozzle 17, a rotary slide valve 18 serving to shut off the nozzle 17.

The barrel pump 6 pumps the secondary constituent through a pressure hose 7 into the second intermediate storage chamber 8, being the cylinder of a plunger pump 19, the plunger 20 of which is mounted on a spindle 21 seated in a spindle nut which latter is accommodated in a gear case 22 and is driven by a variable servomotor 23. The plunger 20 passes through a wiping seal 24 at the end of the cylinder 8. The inlet for the secondary constituent, which is fed into the chamber via a check valve 25 and a rotary slide valve 26, is located on the opposite end of the cylinder 8. The outlet of the plunger pump 19, which is connected with the inlet of the static mixer 16 via a line 27, is provided laterally on the pump, and an additional rotary slide valve 28 is arranged immediately upstream of the static mixer.

For filling the intermediate storage chamber 8, the barrel pump 6 is switched on whereby it is caused to feed the secondary constituent through the open rotary slide valve 26 and the check valve 25, which is open in this direction, and into the cylindrical intermediate storage chamber 8. The filling rate in the intermediate storage chamber 8 can be derived from the position of the plunger 20, which is monitored for this purpose by means of two positional sensors 29 and 30 that control the pump 6. When the plunger 20 is almost in its extreme forward position the positional sensor 30 responds and switches on the pump 6. During the refilling process that follows the plunger 20 is moved back, preferably by separating the spindle 21 from the servomotor 23, so that the plunger 20 will be urged back by the secondary constituent flowing in through the pressure hose 7. When the plunger has almost reached its retracted end position, the positional sensor 29 responds to switch the pump 6 off again. Such a refilling process may take place in the working interval between sealing of two successive insulating glass panes. Short-time refilling processes may also take place when the nozzle 17 arrives at a corner of an insulating glass pane, where the sealing process is shortly interrupted. For metering out the secondary constituent, the servomotor 23 drives the plunger 20 into the cylinder 8, according to predetermined criteria or in a servo-controlled way, thereby displacing a defined volume of the secondary constituent which flows into the static mixer 16 via the line 27. The gear pump 14 is driven in synchronism with the servomotor 23 and feeds a defined volume of the main constituent from the intermediate storage chamber 5 into the static mixer 16, the feeding operation of the gear pump 14 being supported by the initial pressure prevailing in the intermediate storage chamber 5. When the piston 10 arrives at a position near its forward end position, a positional sensor 31 associated to it responds and switches on the barrel pump 3 thereby causing the latter to refill the main constituent into the intermediate storage chamber, against the initial pressure prevailing in the intermediate storage chamber 5, and to thereby urge back the piston 10. When the piston 10 reaches a position near its rear end position, an additional positional sensor 32 responds and deactivates the barrel pump 3. It is thus possible to meter out the main constituent without any interruption. The rotary slide valves 18, 26 and 28 may be shut off during operating intervals.

The arrangement comprising the nozzle 17, the static mixer 16, the gear pump 14 together with its associated intermediate storage chamber 5, and the plunger pump 19 with its integrated intermediate storage chamber 8, form together a sub-assembly that may be arranged on a common support and may be moved as a single unit when the nozzle 17 is moved along the edge of an insulating glass pane, for which purpose the sub-assembly is mounted movably on the frame of a sealing machine, for upward and downward movement, and at least the nozzle is in addition pivotally mounted in the way described, for example, by EP 0 709 144 A1 with reference to one example of a prior-art machine for sealing insulating glass panes, to which explicit reference is herewith made.

What is claimed is:

1. A machine for filling the edge joint of insulating glass panes with a semi-liquid to paste-like sealing compound, consisting of a main constituent and a secondary constituent, which are different in chemical terms and in terms of their viscosity, having two pumps (3, 6) which convey the two constituents from two reservoirs (1, 2) into separate intermediate storage chambers (5, 8), and having separate, synchronously driven metering pumps (14, 19), which are metering volumetrically, for conveying the constituents in a predetermined mass ratio to a mixer (16) and then on to a nozzle (17), the nozzle and the mixer belonging to a sub-assembly which is movably mounted, in its entirety, on a frame of the machine, characterized by a gear pump (14), driven by a servomotor, as metering pump for the main constituent in combination with a piston pump (19), which serves as a metering pump for the secondary constituent having a lower viscosity and whose piston (20) is driven by a second servomotor (23), both of which are part of the movable sub-assembly.

2. The machine as defined in claim 1, characterized in that the intermediate storage chamber (8) for the secondary constituent is part of the sub-assembly which is movably mounted, in its entirety, on the frame of the machine.

3. The machine as defined in claim 1, characterized in that the piston (20) of the piston pump (19) is driven via a spindle drive (21, 22).

4. The machine as defined in claim 3, characterized in that the cylinder of the piston pump (19) serves as the intermediate storage chamber (8) for the secondary constituent.

5. The machine as defined in claim 1, characterized in that the pump (6) associated to the reservoir (2) for the secondary constituent conveys the secondary constituent directly into the cylinder of the piston pump (19).

6. The machine as defined in claim 1, characterized in that the piston pump (19) is a plunger pump.

7. The machine as defined claim 1, characterized in that the intermediate storage chamber (5) for the main constituent is part of the sub-assembly which is movably mounted, in its entirety, on the frame of the machine.

8. The machine as defined in claim 7, characterized in that the pump (3) associated to the reservoir (1) for the main constituent conveys the main constituent directly into the intermediate storage chamber (5) associated to the gear pump (14), which is located immediately upstream of the inlet of the gear pump (14).

9. The machine as defined in claim 1, characterized in that the intermediate storage chamber (5) for the main constituent is subjected to an initial pressure or pre-pressure.

10. The machine as defined in claim 1, characterized in that the intermediate storage chamber (5) for the main constituent is designed to permit continuous refilling.

11. The machine as defined in claim 1, characterized in that the intermediate storage chamber (5) for the main constituent is a piston-cylinder unit.

12. The machine as defined in claim 1, characterized in that the gear pump (14) is arranged immediately upstream of the inlet of the mixer (16).

13. The machine as defined in claim 1, characterized in that the piston pump (14) is arranged immediately upstream of the mixer (16).

14. The machine as defined in claim 1, characterized in that the intermediate storage chamber (5) for the main constituent is arranged immediately upstream of the gear pump (14).

15. The machine as defined in claim 1, characterized in that the nozzle (17) is arranged immediately downstream of the outlet of the mixer (16).

* * * * *